United States Patent [19]

Tsien et al.

[11] Patent Number: 5,652,344
[45] Date of Patent: Jul. 29, 1997

[54] 2-AMINO-5-NITROTHIAZOLE DERIVED MONOAZO DISPERSE DYES

[75] Inventors: Hsien-Chyang Tsien; Kuan-Po Chu; Hung Chang, all of Taipei, Taiwan

[73] Assignee: Allied Industrial Corp., Ltd., Taipei, Taiwan

[21] Appl. No.: 719,653

[22] Filed: Sep. 25, 1996

[51] Int. Cl.$^6$ .................. C09B 29/042; C09B 29/085; D06P 11/18; D06P 3/42; D06P 3/54
[52] U.S. Cl. ............................................. 534/795
[58] Field of Search ............................. 534/795

[56] References Cited

U.S. PATENT DOCUMENTS

| | | | |
|---|---|---|---|
| 2,659,719 | 11/1953 | Dickey et al. | 534/795 |
| 2,790,791 | 4/1957 | Towne et al. | 534/795 |
| 3,775,049 | 11/1973 | Wolfrum et al. | 534/795 |
| 3,997,520 | 12/1976 | Altermatt | 534/795 |
| 4,078,890 | 3/1978 | Koller et al. | 534/795 X |
| 4,642,339 | 2/1987 | Niwa et al. | 534/550 |

FOREIGN PATENT DOCUMENTS

| | | | |
|---|---|---|---|
| 1534269 | 7/1968 | France | 534/795 |
| 47-26652 | 7/1972 | Japan | 534/795 |

*Primary Examiner*—Floyd D. Higel
*Attorney, Agent, or Firm*—Bacon & Thomas

[57] ABSTRACT

2-amino-5-nitrothiazole derived compounds having the following formula:

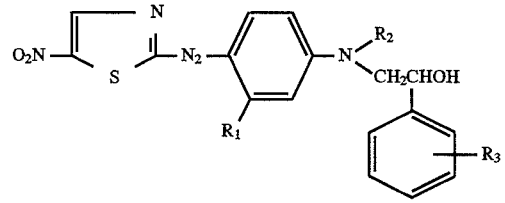

Wherein R1=H or alkyl of 1–4 carbons, R2=alkyl of 1–4 carbons or allyl group and R3=H, halogen or alkyl of 1–4 carbons.

The invented compounds are suited for disperse dyestuffs and are able to dye polyester and cellulose acetate fibers with excellent build-up, exhaustion and sublimation fastness. The invention also provides a process for the preparation of the new compounds.

6 Claims, No Drawings

2-AMINO-5-NITROTHIAZOLE DERIVED MONOAZO DISPERSE DYES

FIELD OF THE INVENTION

The present invention relates to new monoazo disperse dyestuffs, especially to monoazo disperse dyes derived from 2-amino-5-nitrothiazole. The compounds are useful for the coloration of polyester and cellulose acetate fabrics with good dyeing properties, such as build-up, exhaustion, nitrogen oxide and sublimation fastness.

BACKGROUND OF THE INVENTION

In the field of dyestuffs, numerous monoazo disperse dyes derived from 2-amino-5-nitrothiazole are known to be useful in dyeing polyester or cellulose acetate fabrics. Among them, disperse blues 82, 102 and 106 are good examples of disperse dyes derived from 2-amino-5-nitrothiazole.

The above-said chemicals have the following structure:

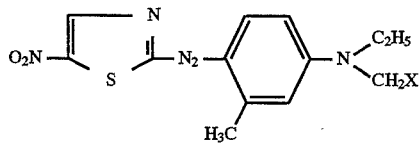

Wherein $X=CH(OH)CH_2Cl$ (disperse blue 82), $X=-CH(OH)CH_2OH$ (disperse blue 102) or $X=-CH_2OH$ (disperse blue 106).

In the conventional 2-amino-5-nitrothiazole derived disperse dyestuffs as described above, disperse blue 102 dyes cellulose acetate textile only. It can not dye polyesters. Disperse Blue 106 dyes polyester in poor build-up, exhaustion and sublimation fastness. Disperse Blue 82 dyes polyester with poor sublimation fastness as well.

It is thus an urgent need in the industry to have novel disperse dyestuff that can solve the problems rest in the conventional art.

OBJECT OF THE INVENTION

It is thus an object of the invention to provide novel 2-amino-5-nitrothiazole derived disperse dyestuffs.

A further object of the invention is to provide dyestuffs suited for the dyeing of polyester and cellulose acetate textiles with good dyeing properties.

SUMMARY OF THE INVENTION

According to this invention, novel 2-amino-5-nitrothiazole derived compounds are disclosed. The invented compounds have the following formula:

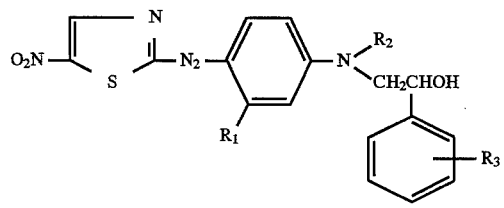

Wherein R1=H or alkyl of 1–4 carbons, R2=alkyl of 1–4 carbons or allyl group and R3=H, halogen or alkyl of 1–4 carbons.

The invented compounds are suited for disperse dyestuffs and are able to dye polyester and cellulose acetate fibers with excellent build-up, exhaustion and sublimation fastness. The invention also provides a process for the preparation of the new compounds.

The above and other objects and advantages of this invention may be more clear from the following detailed description of the invention.

DETAILED DESCRIPTION OF THE INVENTION

According to this invention, novel 2-amino-5-nitrothiazole derived disperse dyestuffs are provided. The invented compounds have the following formula:

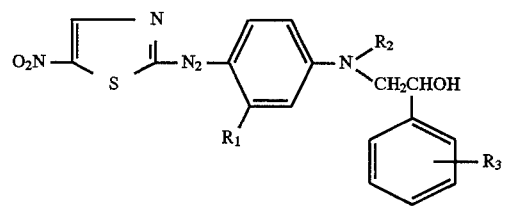

Wherein R1=H or alkyl of 1–4 carbons, R2=alkyl of 1–4 carbons or allyl group and R3=H, halogen or alkyl of 1–4 carbons.

According to the embodiments of the invention, a diazonium salt of 2-amino-5-nitrothiazole is prepared in a 50% $H_2SO_4$ solution with nitrosylsulfuric acid. A coupler is then added under low temperature. The couplers suited in this invention include: N-ethyl, N-methyl, N-propyl or N-butyl, N-(β-hydroxy-β-phenyl)ethyl toluidine and m-alkyl (1–4 carbons)-substituted toluidine. N-ethyl-N-[β-hydroxy-β(4-alkylphenyl)]ethyl toluidines are also suitable as couplers for the new compounds.

If N-ethyl-N-(β-hydroxy-β-phenyl)ethyl-m-toluidine is the coupler, it can be prepared from the reaction of N-ethyl-m-toluidine with styrene oxide in the presence of a small amount of acetic acid as catalyst.

The invented compounds are suited for disperse dyestuffs to dye polyester and cellulose acetate fibers with excellent build-up, exhaustion and sublimation fastness.

EMBODIMENTS

The followings are descriptions to the embodiments of the preparation of the 2-amino-5-nitrothiazole compounds of this invention.

Embodiment I

2-Amino-5-nitrothiazole (7.25g, 0.05mole) was dissolved in a mixture of 33g conc. $H_2SO_4$ and 33 g ice at 25° C. A solution of 3.5 g $NaNO_2$ (0.0507 mole) dissolved in 45 g conc. $H_2SO_4$ was added dropwise to the amino nitrothiazole solution at −10° C. to 0° C. with stirring. After 30 minutes of stirring at −10° C. to 0° C., the resulting diazonium salt was slowly added to the cooled solution of 12.75 g of N-ethyl-N-(β-hydroxy-β-phenyl)-ethyl-m-toluidine dissolved in 300 ml, 15% $H_2SO_4$ at −5° to 0° C. The mixture was stirred at −5° to 0° C. for 1 hour and diluted with 200 ml $H_2O$. The product so obtained is collected by filtration and washed with water. The compound so obtained has the following structure:

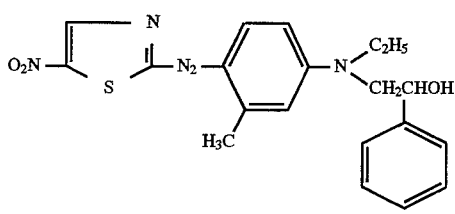

The compound may function as a dyestuff. Its absorption maximium is 596.5 nm.

The dye was dispersed with Reax 83A and dyed on polyester in bright blue shade with excellent build-up, exhaustion and sublimation fastness.

Embodiment II

The diazonium salt of 2-amino-5-nitrothiazole was prepared according to the processes as in Embodiment I. A coupler of 12.05 g (0.05 mole) of N-methyl-N-(β-hydroxy-β-phenyl)ethyl-m-toluidine is employed in replacement of the 0.05 mole of N-ethyl-N((β-hydroxy-(β-phenyl) ethyl-m-toluidine, as in Embodiment I. The processes of Embodiment I were followed. The product so obtained has the following structure:

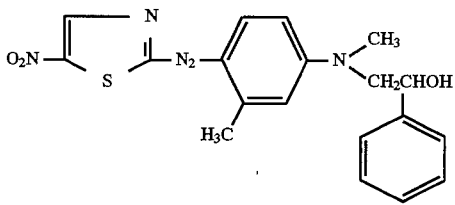

The compound was dispersed with Reax 85A and dyed on polyester fabric in bright blue shade with excellent dyeing property such as build-up, exhaustion, and sublimation fastness.

Embodiment III

The processes of example I were followed where 11.35 g N-ethyl-N(β-hydroxy-β-phenyl)ethyl aniline, instead of 0.05 mole of N-ethyl-N-β-hydroxy-β-phenyl)ethyl-m-toluidine, was employed as the coupler. The product so obtained has the following chemical structure:

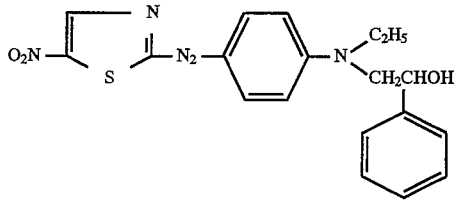

The dye was dispersed with Reax 85A and dyed on polyester and cellulose acetate in bright blue shade with excellent sublimation fastness and exhaustion properties.

We claim:

1. A compound of the formula:

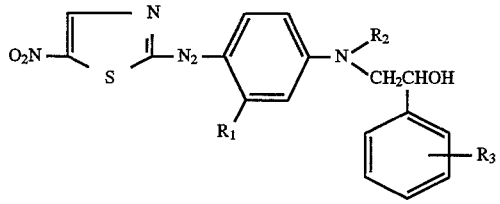

wherein $R_1$ represents H or alkyl of 1–4 carbon atoms; $R_2$ represents H, allyl or alkyl of 1–4 carbon atoms; and $R_3$ represents H, halogen or alkyl of 1–4 carbon atoms.

2. The compound of claim 1 wherein $R_1=CH_3$, $R_2=C_2H_5$ and $R_3=H$.

3. The compound of claim 1 wherein $R_1=H$, $R_2=C_3H_7$ and $R_3=CH_3$.

4. The compound of claim 1 wherein $R_1=C_2H_5$, $R_2=CH_2CH=CH_2$ and $R_3=H$.

5. A dye composition with an effective amount of the compound of claim 1.

6. A dye composition with an effective amount of the compound of any one of claims 2–4.

* * * * *